(12) United States Patent  
McIsaac

(10) Patent No.: US 8,286,981 B2
(45) Date of Patent: Oct. 16, 2012

(54) BICYCLE PROPULSION ASSEMBLY HAVING TELESCOPING ELONGATE MEMBERS ENGAGEABLE THROUGH CIRCULAR MOTION

(76) Inventor: Gerald McIsaac, Tsay Keh Dene (CA)

( * ) Notice: Subject to any disclaimer, the term of this patent is extended or adjusted under 35 U.S.C. 154(b) by 119 days.

(21) Appl. No.: 12/989,191

(22) PCT Filed: Mar. 24, 2009

(86) PCT No.: PCT/CA2009/000334
§ 371 (c)(1),
(2), (4) Date: Dec. 7, 2010

(87) PCT Pub. No.: WO2009/129594
PCT Pub. Date: Oct. 29, 2009

(65) Prior Publication Data
US 2011/0115190 A1    May 19, 2011

(51) Int. Cl.
*B62M 1/04* (2006.01)
(52) U.S. Cl. ............... 280/255; 280/258; 280/253
(58) Field of Classification Search .......... 280/255, 280/258–260, 253, 256, 252
See application file for complete search history.

(56) References Cited

U.S. PATENT DOCUMENTS

| 1,427,589 A | 8/1922 | Greenison |
| 1,739,628 A | 12/1929 | Bemont |
| 3,375,023 A | 3/1968 | Cox |
| 3,633,938 A | 1/1972 | Solomon et al. |
| 3,661,404 A | 5/1972 | Bossaer |
| 3,759,543 A | 9/1973 | Clark |
| 3,881,747 A | 5/1975 | Abbott |
| 3,984,129 A | 10/1976 | Hege |
| 4,666,173 A * | 5/1987 | Graham ............ 280/255 |
| 5,335,927 A * | 8/1994 | Islas ............... 280/255 |
| 5,390,773 A | 2/1995 | Proia |
| 5,405,157 A * | 4/1995 | Bezerra et al. ........ 280/253 |
| 5,785,337 A | 7/1998 | Ming |
| 5,871,221 A | 2/1999 | Min et al. |
| 5,988,662 A | 11/1999 | Staehlin |
| 6,209,900 B1 * | 4/2001 | Yoshizawa ........... 280/252 |
| 6,595,535 B2 * | 7/2003 | Farina ............. 280/255 |
| 6,659,486 B2 * | 12/2003 | Eschenbach ........ 280/221 |
| 6,764,088 B2 * | 7/2004 | Hung ............... 280/221 |
| 6,964,424 B2 | 11/2005 | Wielkopolski |
| 7,717,448 B2 * | 5/2010 | Clemons et al. ....... 280/258 |

FOREIGN PATENT DOCUMENTS

| CA | 2120535 | 10/1995 |
| CA | 2296166 | 7/2001 |

* cited by examiner

*Primary Examiner* — Tashiana Adams
*Assistant Examiner* — Michael Stabley
(74) *Attorney, Agent, or Firm* — Cameron IP

(57) ABSTRACT

The present invention provides a propulsion assembly for a bicycle. The propulsion assembly includes a support member that at least extends from the bicycle frame to a distal end spaced-apart from the rear wheel. The assembly includes a first drive mechanism rotatably mounted on the frame and axially connected to the rear wheel for transmitting motion thereto. A second drive mechanism is rotatably mounted at the distal end of the support member and coupled with the first drive mechanism. Ratchet mechanisms axially extend from the second drive mechanism and connect to a pair of elongate members. The bicycle has pedal arms with pedals extending therefrom. The elongate members are pivotally, operatively connected to the pedals. The pedals with pedal arms are movable in a circular manner for transmitting rotational power to the elongate members for propelling the bicycle.

14 Claims, 7 Drawing Sheets

US 8,286,981 B2

BICYCLE PROPULSION ASSEMBLY HAVING TELESCOPING ELONGATE MEMBERS ENGAGEABLE THROUGH CIRCULAR MOTION

BACKGROUND OF THE INVENTION

1. Field of the Invention

The present invention relates to a propulsion assembly having elongate members. In particular, it relates to a propulsion assembly having elongate members as used in bicycles.

2. Description of the Related Art

The concept of using reciprocating elongate members for propelling a bicycle is known. For example, Canadian Patent No. 2,120,535 to Rakocevic shows a pair of elongate members that extend past the rear of the rear wheel to a clutch system using two chains. The clutch system is supported by a long, curved tube which extends back from the frame and around the rear wheel. While the bicycle in Rakocevic provides relatively long elongate members, it is unclear whether the bicycle with its curved tube is sufficiently stable to function properly. Also, the bicycle in Rakocevic suffers the disadvantage of requiring a number of exposed parts, including two chains and cables which may be prone to entanglement and failure. Moreover, while bicyclists are accustomed to circular motion when pedalling, the bicycle in Rakocevic requires a user to pedal it in an ungainly up and down manner.

The idea of using elongate members in combination with a ratchet system for bicycles per se is also known. U.S. Pat. No. 3,881,747 to Abbott shows a bicycle foot pedal that is movable through an adjustable linkage of elongate members. The elongate members are in the form of levers for transmitting one-way rotational power to an elevated drive sprocket. However, Abbott splits the elongate members into two articulated portions and as a result the propulsion system provides a diminished leverage or torque. Abbott also requires for its propulsion system a bicycle that is highly modified. Lastly, the bicycle in Abbott requires the user to pedal it in an unconventional, primarily up and down manner.

BRIEF SUMMARY OF INVENTION

An object of the present invention is to provide an improved propulsion assembly for a bicycle that overcomes the above disadvantages.

More particularly, the present invention provides a propulsion assembly with elongate members that are telescoping. The elongate members are connected to pedals with pedal arms to provide the user with the mechanical advantage afforded by elongate members while at the same time conveying the natural feeling of a conventional bicycle that requires circular motion for propelling forward. The assembly is also configured to require fewer and more compact parts and hence is more robust. It can also be retrofitted onto a conventional bicycle According to one aspect of the invention, there is provided a propulsion assembly for a bicycle. The bicycle has a frame with a top and a bottom opposite the top. The bicycle has a front with a front wheel rotatably connected thereto at the bottom, and a rear opposite the front with a rear wheel rotatably connected thereto at the bottom. The assembly includes a rearwardly extending support member extending from the top of the frame to a distal end of the support member. The distal end is spaced-apart from the rear wheel. The assembly includes a first drive mechanism rotatably mounted on the frame and mechanically connected to the rear wheel for transmitting motion thereto. A second drive mechanism is rotatably mounted near the distal end of the support member. The second drive mechanism is spaced-apart from the seat post and has an axis of rotation. The assembly includes a coupling member coupling the first drive mechanism to the second drive mechanism. A pair of ratchet mechanisms operatively connect to the second drive mechanism and with the axis of rotation of the second drive mechanism. The second drive mechanism is between the pair of ratchet mechanisms. The assembly includes a first elongate member and a second elongate member. Each elongate member operatively connects to the second drive mechanism by means of a respective one of the pair of ratchet mechanisms and extends therefrom. The elongate members are telescopic. The assembly includes a pedal arm axle rotatably mounted to the frame near the bottom thereof between the front and the rear of the frame. The assembly includes a first pedal arm and a second pedal arm angularly spaced-apart from the first pedal arm. The pedal arms extend from opposite ends of the pedal arm axle. The assembly includes a first pedal and a second pedal rotatably connected to the first pedal arm and the second pedal arm, respectively, for pedaling the bicycle. The first elongate member and the second elongate member extend towards and operatively connect with the first pedal and the second pedal, respectively. The pedals are rotatably movable for transmitting rotational power through the elongate members and to the second drive mechanism for pedalling the bicycle.

According to another aspect of the invention, there is provided a propulsion assembly for a bicycle having a frame with a top having a seat post with seat extending therefrom, and a bottom opposite the top. The bicycle has a front with a front wheel rotatably connected thereto at the bottom, and a rear opposite the front with a rear wheel rotatably connected thereto at the bottom. The assembly includes a rearwardly extending support member extending from the frame, away from the seat post, to a distal end of the support member. The distal end is spaced-apart from the rear wheel and includes a support housing. A rear axle is axially connected to the rear wheel and rotatably mounted on the frame. A rear sprocket radially extends from the rear axle at one end of the rear axle. The rear sprocket is axially connected to the rear wheel for transmitting motion thereto. The assembly includes a drive axle is rotatably received in part within the support housing. A rotatable drive sprocket radially extends from the drive axle at one end of the drive axle. The drive sprocket is spaced-apart from the seat post. The drive sprocket having an axis of rotation. An endless chain is operatively connected the rear sprocket to the drive sprocket. The assembly includes a pair of ratchet mechanisms. Each ratchet mechanism includes a hollow outer portion rotatably mounted on the drive axle via a pair of bearings and connects to a respective one of the elongate members. A ratchet gear is disposed within the outer portion and connects to the drive axle. Each ratchet mechanism includes a pawl pivotally connected to the outer portion and positioned for rotatable engagement with the ratchet gear in a first direction and for freely passing over with the ratchet gear in a second direction opposite the first direction. The assembly includes a first elongate member and a second elongate member. Each elongate member is connected to a respective one of the outer portions of the pair of ratchet mechanisms. The elongate members operatively extending from the drive sprocket. The elongate members are telescopic. A pedal arm axle is rotatably mounted to the bottom of the frame between the front and the rear of the frame. The assembly includes a first pedal arm and a second pedal arm angularly spaced-apart from the first pedal arm. The pedal arms extends from opposite ends of the pedal arm axle. The assembly includes a first pedal and a second pedal rotatably connected to the first pedal arm and the second pedal arm, respectively, for pedaling the bicycle. The first elongate member and the second elongate member extend towards and operatively connect with the first pedal and the second pedal, respectively. The pedals are rotatably movable for transmitting one-way rotational power through the elongate members, to rotate the drive sprocket, the endless chain thereby, the rear sprocket thereby and the rear wheel thereby for pedalling the bicycle.

BRIEF DESCRIPTION OF DRAWINGS

The invention will be more readily understood from the following description of preferred embodiments thereof given, by way of example only, with reference to the accompanying drawings, in which.

DESCRIPTION OF THE PREFERRED EMBODIMENTS

Figure 1:
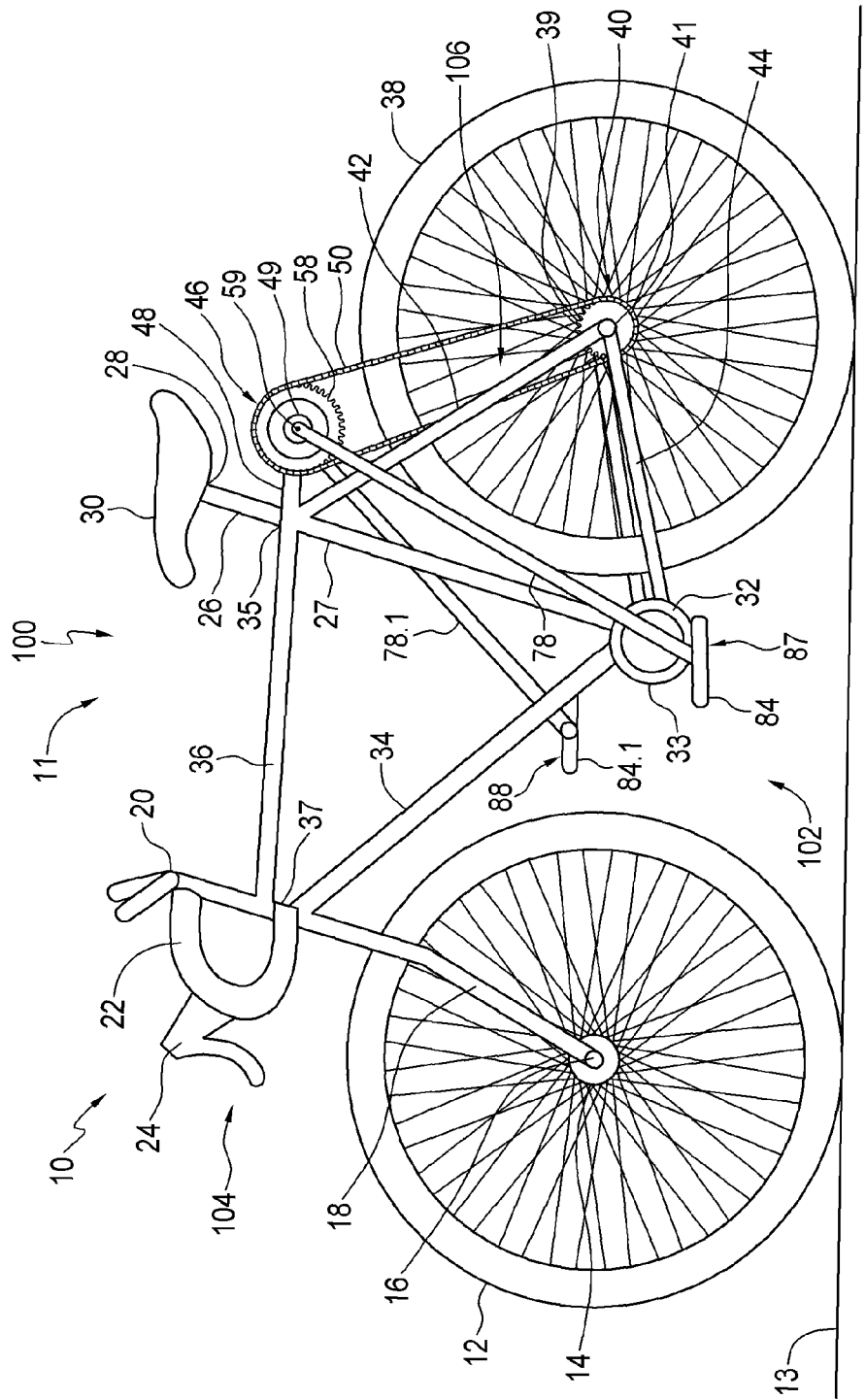
FIG. 1 is a side elevation view of a bicycle with a propulsion assembly according to one embodiment of the invention.

Referring to the drawings and first to FIG. 1, there is provided a bicycle 10. The bicycle has a frame 11 with a top 100, bottom 102, front 104 and rear 106. The bicycle has a front wheel 12 at the front of the frame towards the bottom connected to a front axle 14. The front axle 14 is rotatably connected to the frame 11 at first end 16 of a front fork 18. The front fork 18 vertically extends upwards from the perspective of FIG. 1 to a second end 20. A handle bar 22 extends from the second end 20. The handle bar 22 has brakes levers 24 for braking the bicycle.

The bicycle 10 has a seat tube 27 that substantially extends vertically from an upper end 28 to a lower end 32 at the bottom of the frame. The lower end 32 in this example includes a front sprocket 33, though this is not required. A crossbar 36 extends substantially horizontally, from the perspective of FIG. 1, from the front fork 18 at point 37 to the seat tube 27 at junction 35 in between the upper end 28 and lower end 32. The seat tube 27 includes a seat post 26 that extends from the junction 35 to upper end 28. The seat post 26 supports a seat 30. A down tube 34 extends diagonally from the front fork 18 by point 37 to the lower end 32 of the seat tube 27.

The bicycle 10 has a rear wheel 38 at the rear. The rear wheel 38 is operatively coupled to a first drive mechanism 40. The first drive mechanism 40 in this example comprises a rear axle 41 and a rear sprocket 39 radially extending outwards therefrom on one end of the rear axle 41. The first drive mechanism 40 is rotatably mounted on the frame through the rear axle 41. The frame includes a pair of spaced-apart seat stays 42 that diagonally extend on either side of the rear wheel from the rear axle 41 to the junction 35. The frame includes a pair of spaced-apart chain stays 44 that extend on either side of the rear wheel from the rear axle 41 along the bottom of the frame to the lower end 32 of the seat tube 27.

The above description of FIG. 1 until this point describes a conventional bicycle that rests on ground 13.

Referring now to the propulsion assembly according to one embodiment of the invention, a support member 48 extends towards the rear of the frame to a distal end 49. The distal end 49 of the support member is spaced-apart from the seat post 26 and spaced-apart from and above the rear wheel 38, from the perspective of FIG. 1. In this example, the support member 48 extends horizontally rearward from the junction 35, from the perspective of FIG. 1.

Figure 2:
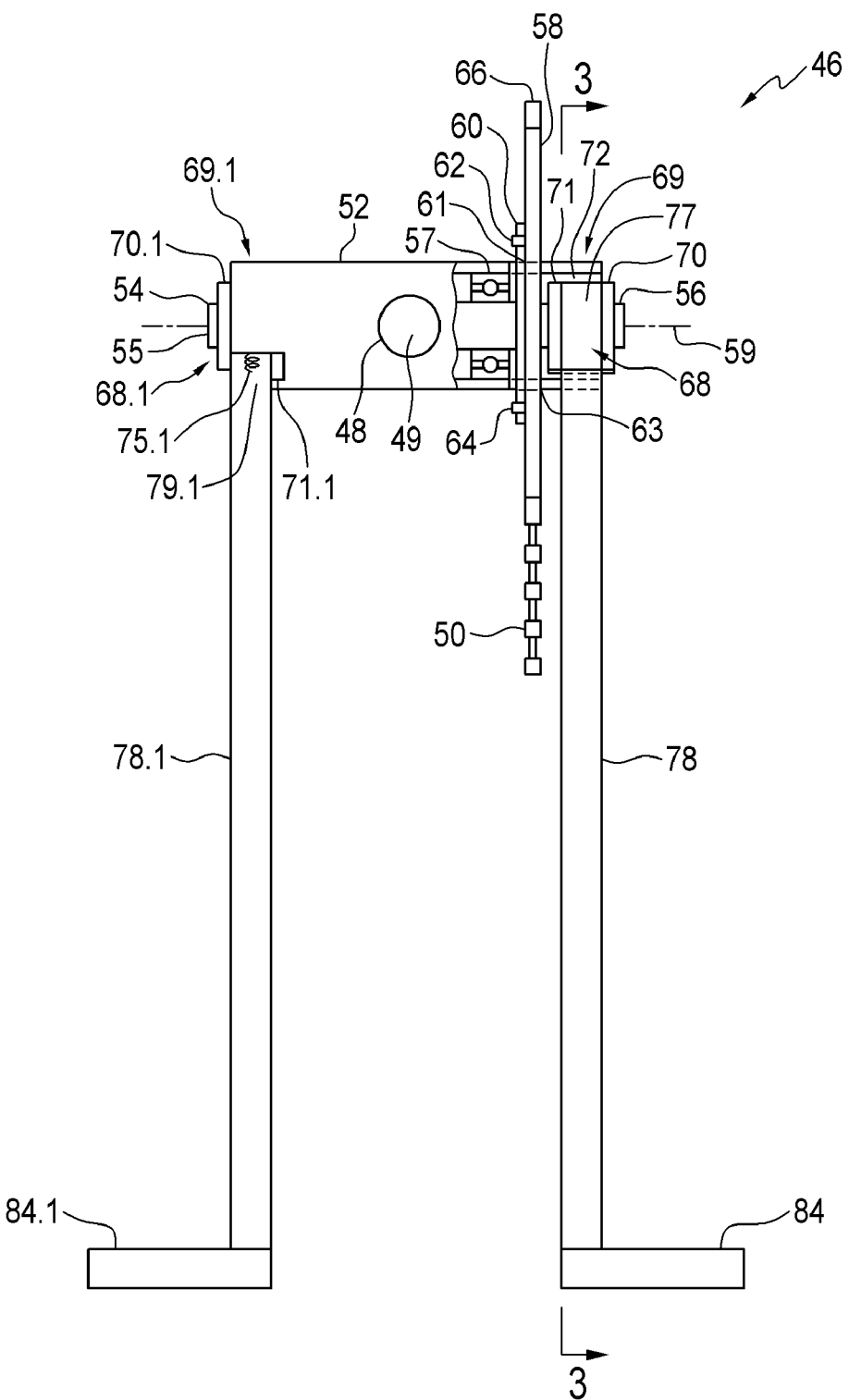
FIG. 2 is a front, partially broken away, elevation view showing part of the propulsion assembly of FIG. 1.

Referring to FIG. 2, the distal end 49 of the support member 48 includes a support housing 52. The support housing 52 is stationary with respect to the frame. The support housing 52 is shown partially broken away to the right from the perspective of FIG. 2.

A second drive mechanism 46 is rotatably connected to the stationary support housing 52. The second drive mechanism 46 includes a drive axle 54 rotatably received within the support housing 52 through bearings as in part revealed by bearing 57. The drive axle 54 has opposed ends 55 and 56. The drive axle 54 is rotatable about an axis of rotation 59. The second drive mechanism 46, in this example, includes a mounting plate 60 connected to and radially extending outwards from the drive axle 54. The second drive mechanism 46 also includes, in this example, a drive sprocket 58. The drive sprocket 58 is coupled to and radially extends outwards from the drive axle 54 through the mounting plate 60 via bolts 62 and 64. Those skilled in the art will appreciate that a mounting plate is not required for the second drive mechanism. For example, the drive sprocket can be directly connected to the drive axle. The supporting housing has apertures 61 and 63 enabling the drive sprocket and mounting plate to rotate and not be inhibited by the support housing 52. The drive sprocket 58 has teeth 66 for engaging a coupling means which in this example is an endless chain 50.

The support housing 52 further includes a pair of stationary ratchet housings 69 and 69.1 located near opposite ends 55 and 56 of the drive axle 54, respectively. The ratchet housing 69 includes a bearing (not shown) similar to bearing 57 that fits within a groove of the drive axle 54 so that the drive axle 54 may rotate therethrough and so that the ratchet housing 69 is retained in its position as shown in FIG. 2. Each of the ratchet housings and the components therein is substantially the same with one of the pair of ratchet housings 69 being a mirror-image of the other. Accordingly, only one of the pair of ratchet housings 69 is described in detail herein with the understanding that the other ratchet housing 69.1 has a similar structure and function. For the ratchet housing 69.1 like parts have been given like reference numerals as the first ratchet housing with the additional designation "1".

Figure 3:
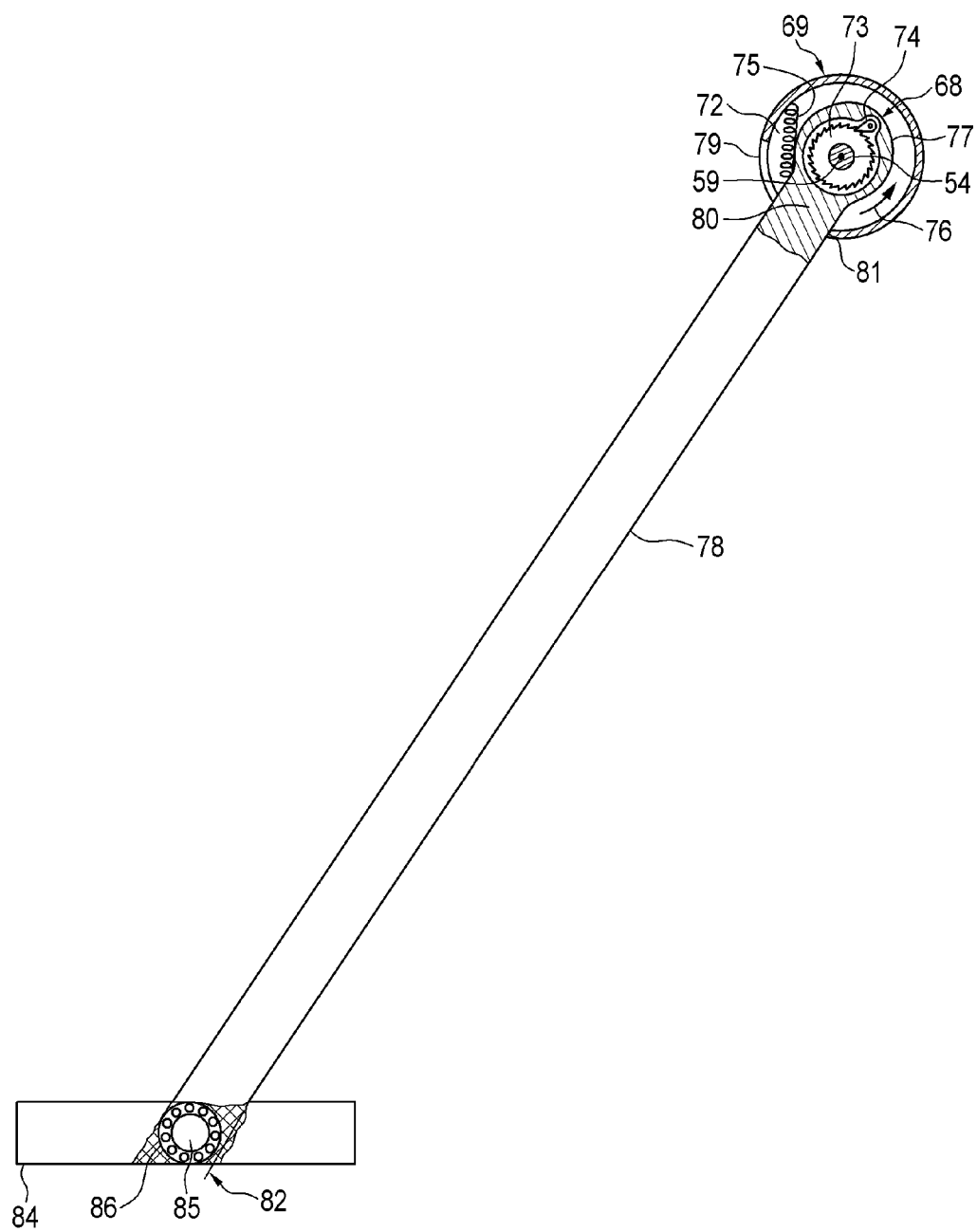
FIG. 3 is a sectional, side elevation view along lines 3-3 of FIG. 2 showing a side view of an elongate member connected to a ratchet mechanism.

Referring to FIG. 2, the ratchet housing 69 is shown partially broken away to reveal its interior 72. A ratchet mechanism 68 is disposed within the interior 72. The ratchet mechanism 68 includes a hollow outer portion 77 axially mounted on the drive axle 54 through bearings 70 and 71. Referring to FIG. 3, the ratchet mechanism 68 includes an inner portion, which in this example is a ratchet gear 73, disposed within the outer portion 77, that is mounted on and co-axial with the drive axle 54.

A pawl 74 is pivotally mounted on the outer portion 77 and is positioned for engaging the ratchet gear 73. The pawl 74 is positioned to allow rotational motion of the ratchet gear 73 and hence the drive axle 54 in substantially one direction only. From the perspective of FIG. 3, when the outer portion 77 is rotated in the counter clockwise direction as indicated by the arrow of numeral 76, the ratchet mechanism is configured for the pawl 74 to forceably engage the ratchet gear 73. When the outer portion 77 is rotated in the clockwise direction, the ratchet mechanism is configured to allow the pawl 74 to freely pass over and not engage the ratchet gear 73. As a result, the outer portion 77 can spin freely in the clockwise direction. Ratchet mechanisms are known in the art and therefore will not be described in further detail herein.

Referring back to FIG. 2, a ratchet mechanism 68.1 is disposed within ratchet housing 69.1 on the other side of the bicycle, and has substantially the same parts and operates in substantially the same manner and therefore will not be described.

A first elongate member 78 and a second elongate member 78.1 extend from the outer portions 77 and 77.1 of the first ratchet mechanism 68 and the second ratchet mechanism 68.1, respectively. The elongate members 78 and 78.1 in this embodiment are rigid and in this example are made of metal. Each of the elongate members is substantially the same with the first elongate member 78 being a mirror-image of the second elongate member 78.1. Accordingly, only the first elongate member 78 is described in detail herein with the understanding that the second elongate member 78.1 has a similar structure and function. For the second elongate member like parts have been given like reference numerals as the first elongate member with the additional designation "0.1".

The first elongate member 78 has a mounting end 80 that connects with the outer portion 77. The elongate member 78 is thus mounted high on and to the rear of the frame, from the perspective of FIGS. 2 and 3. The elongate member 78 is substantially longer than the cranks are a conventional bicycle. For example, the elongate members can be three or four times as long as the cranks of a conventional bicycle, resulting in a corresponding increase in power.

A first resilient member, which in this example is in the form a coil spring 75, is disposed within the interior 72 of the ratchet housing 69. The coil spring 75 is connected on one end to the ratchet housing 69 and to the elongate member 78 on the other end. The coil spring is positioned such that it does not interfere with the pawl 74. The coil spring 75 is in tension when the elongate member 78 is in the lower position 87. When the coil spring 75 is tensioned, it is disposed to urge the outer portion 77 to move in a clockwise direction, from the perspective of FIG. 3. The ratchet housing 69 has a slot 79 for the elongate member 78 to pass through when the outer portion 77 is moved in the clockwise direction. The slot 79 includes a slot end 81 which is an edge of the ratchet housing 69. The coil spring 75 returns to a more elongated form for elevating the elongate member 78 back to the upper position 88. Referring to FIG. 2, in a like manner, a second resilient member in the form a coil spring 75.1 connects to the support housing 69.1. The elongate members are therefore moveable from the lower position 87 as shown for the first elongate member 78, where the coil spring 75 is more tensioned, to an upper position 88 as shown for the second elongate member 78.1 where the coil spring 75.1 is less tensioned. In one example, an elongate member in the upper position 88 is separated by 45 degrees from an elongate member in the lower position 87.

As shown in FIG. 3 the first elongate member 78 has a pedal end 82 that connects to a first pedal 84. The first pedal 84 is rotatably connected to the first elongate member 78 via shaft 85 and bearings 86. This connection is known in the art and therefore will not be described in further detail. In a like manner, a second pedal 84.1 is rotatably connected to the second elongate member 78.1, as shown in FIG. 2.

In operation and referring to FIGS. 1 to 3, when a rider transmits a downward force on a pedal from the perspective of the Figures, this causes the second elongate member 78.1 in the upper position 88 to move through the slot 79 towards the lower position 87. During this process, the pawl 74 engages the ratchet gear 73, and thereby causes the second drive mechanism 46 to rotate via the drive axle 54. The coil spring 75 increases in tension until it effectively acts a mechanical stop by inhibiting the second elongate member 78.1 from rotating past the lower position 87. Alternatively, the slot end 81 shown in FIG. 3 can act as the mechanical stop.

Referring to FIG. 2, the rotation of the drive axle 54 is transmitted to the drive sprocket 58 which in turn causes movement of coupling member 50. The coupling member could equally be a belt or cable and the sprockets pulleys. Referring to FIG. 1, the coupling member 50 engages the first drive mechanism 40 via the rear sprocket 39 and causes the rear axle 41 and thus the rear wheel 38 to rotate thereby. As a result, the bicycle 10 is propelled forward.

As the rider reduces the downward force applied to the pedal, the coil spring 75 becomes less tensioned and thereby causes the second elongate member 78.1 to return upwards to the upper position 88. The process may then be repeated and equally applies to the first elongate member 78. In this way the first elongate member 78 and the second elongate member 78.1 are moveable upwards and downwards, from the perspective of the figures.

The elongate members can be configured for providing reciprocal motion: when the first elongate member is in the lower position, the second elongate member is be in the upper position and vice versa, and when the first elongate members is pushed down upon, the second elongate member is elevated upwards.

Because the elongate members 78 and 78.1 are positioned high and rearward of the frame, in this example spaced-apart rearward from the seat post 26 and above the rear wheel 38, the elongate members 78 and 78.1 are substantially longer than the cranks are a conventional bicycle and those levers of the prior art. This structure thereby provides the significant advantage of a propulsion assembly that allows a rider to apply far more torque to the rear wheel than in a conventional bicycle or the prior art.

The further the distal end 49 of the support member 48 extends from the seat tube, the longer the elongate members can be and thus the greater the torque can be applied against the elongate members for propelling the bicycle forward.

The structure of the present invention provides the additional advantage of enabling a disabled or handicapped person to use a bicycle. This is in part because only up and down motion is required to propel the bicycle forward. The elongate members are adapted such that less force is required by the rider and kinetic movement is less onerous compared to the rotatary motion required of a rider's feet when riding a conventional bicycle. Moreover, the bicycle of the present invention enables a rider to only use one of the elongate members for propelling the bicycle, which is particularly advantageous if, for example, the rider is a leg amputee.

Figure 4:
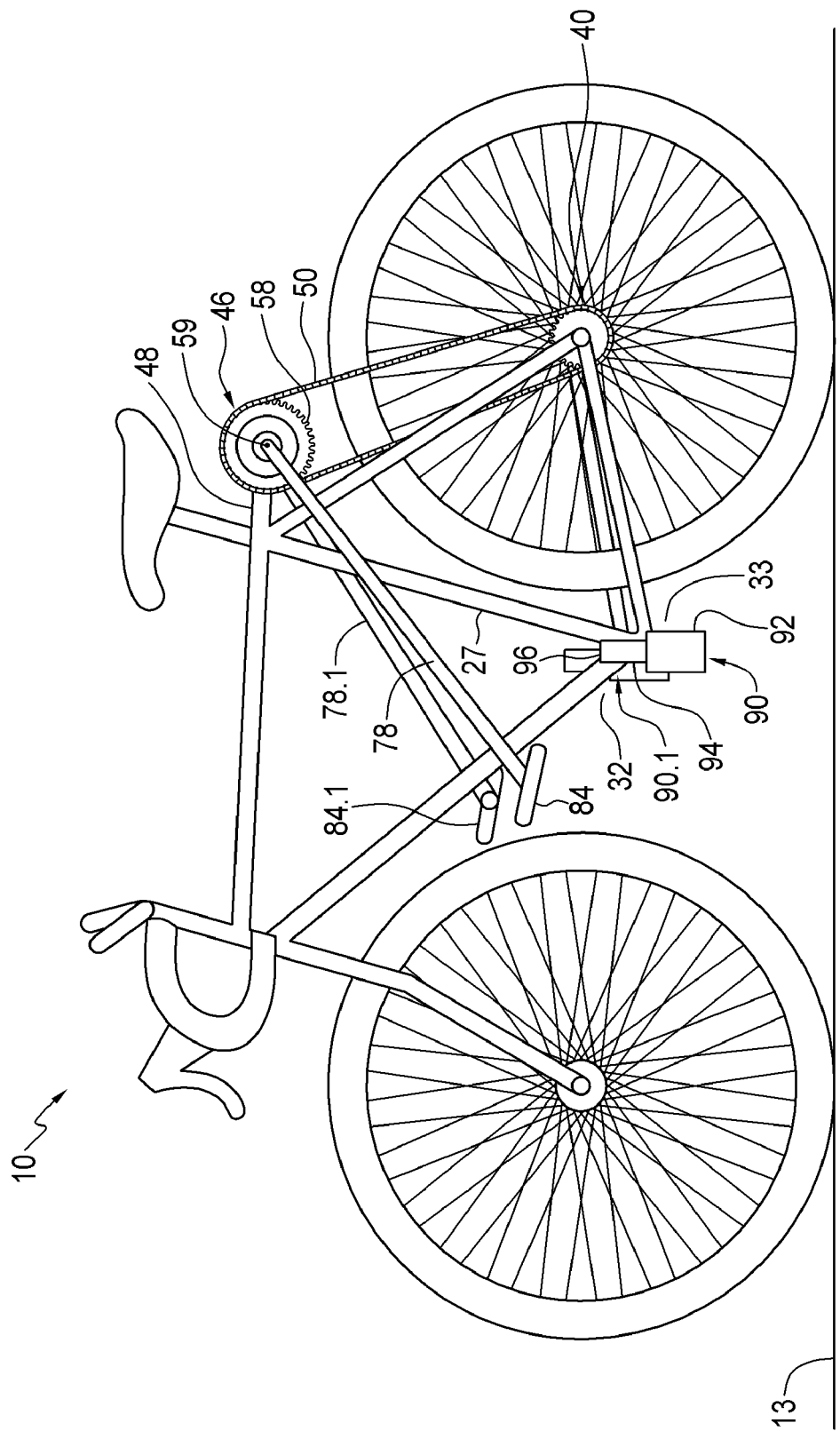
FIG. 4 is a side elevation view similar to FIG. 1 of another embodiment of the present invention.

Another embodiment of the invention is illustrated in FIG. 4. The bicycle shown in FIG. 4 is substantially the same as that of FIGS. 1 to 3, with the exception that instead of resilient members, a first piston 90 and a second piston 90.1 are employed for engaging with the first elongate member and the second elongate member, respectively. In this example the pistons are air pistons. Each of the pistons is substantially the same with the first piston 90 being a mirror-image of the second piston 90.1. Accordingly, only the first piston 90 is described in detail herein with the understanding that the second piston has a similar structure and function.

The first piston 90 in this example is mounted onto the bicycle 10 at the lower end 32 of the seat tube 27 at the bottom of the frame where typically the front sprocket of a conventional bicycle would have been located. The first piston 90 includes a cylinder 92 with a piston rod 94 resiliently received therein. The details of how pistons work will not be discussed in great detail as pistons are known to those skilled in the bicycle art. The piston rod 94 has an outer end 96 positioned for engaging with the pedal 84.

In operation, when the first elongate member 78 is forced downwards by the rider from the perspective of FIG. 4, it abuts the piston rod 94 at end 96. The piston rod 94 resiliently compresses to a point where the elongate member 78 is now in the lower position. Motion is thereby transmitted to the second drive mechanism through to the first drive mechanism for propelling the bicycle. The piston rod 94 acts as a stop to inhibit the elongate member 78 from moving further downward. As the rider reduces the downward force on the first pedal 84, the piston rod 94 resiliently expands and springs the elongate member 78 back upwards to the upper position 88.

The location of the pistons 90 and 90.1 need not be mounted by the front sprocket 33 of a conventional bicycle. For example, the pistons 90 and 90.1 can be mounted anywhere along the pair of seat stays 42, the pair of chain stays 44, or the seat tube 27.

The pistons 90 and 90.1 and the resilient members can be used in conjunction with each other for returning the elongate members back to the upper position.

Instead of using resilient members or pistons, the means for returning the elongate members can be in form of looped bicycle straps attached to the pedals. In order to raise an elongate member back to the upper position, the upper part of the rider's foot can engage the strap and transmit an upward force against the strap to thereby raise the elongate member. These straps are known in the art and therefore will not be described in further detail. In such an embodiment, a mechanical stop such as a knob may also be attached, to the frame or for example within the ratchet mechanism, to ensure that the elongate members do not extend past the lower position.

Figure 5:
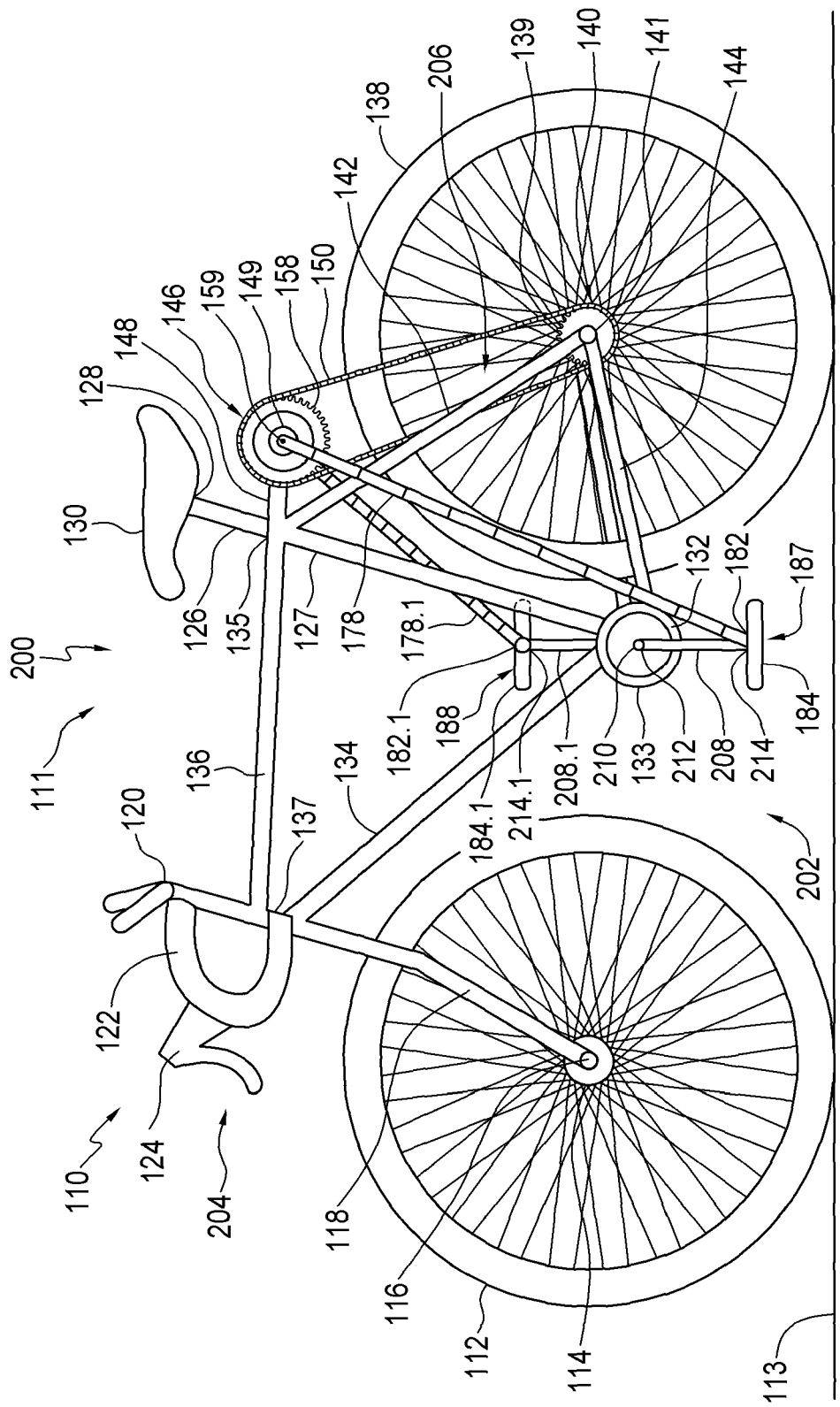
FIG. 5 is a side elevation view of a bicycle with a propulsion assembly according to a further embodiment of the invention.
Figure 6:
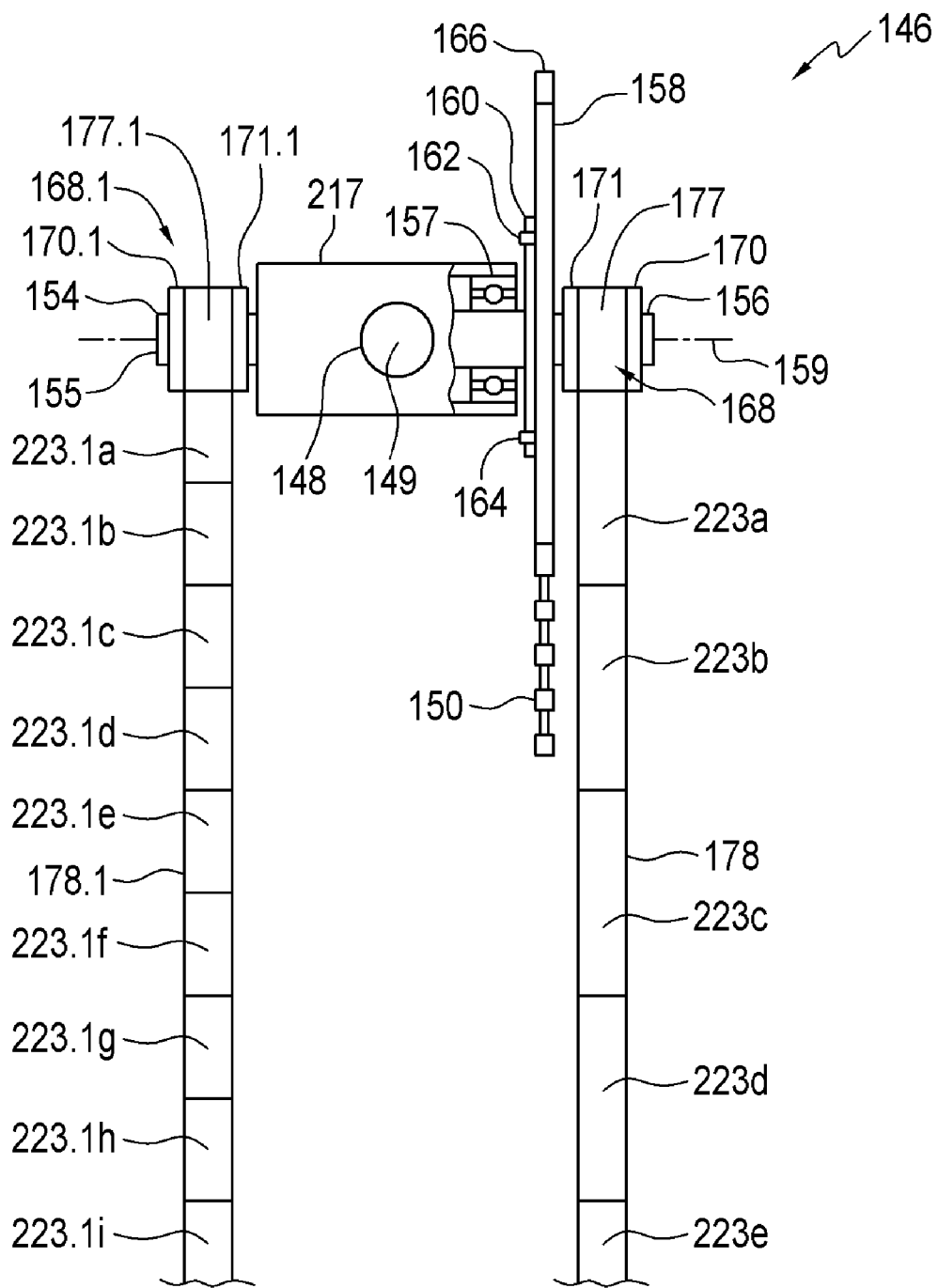
FIG. 6 is a front, partially broken away, elevation view showing part of the propulsion assembly of the embodiment of FIG. 5.
Figure 7:
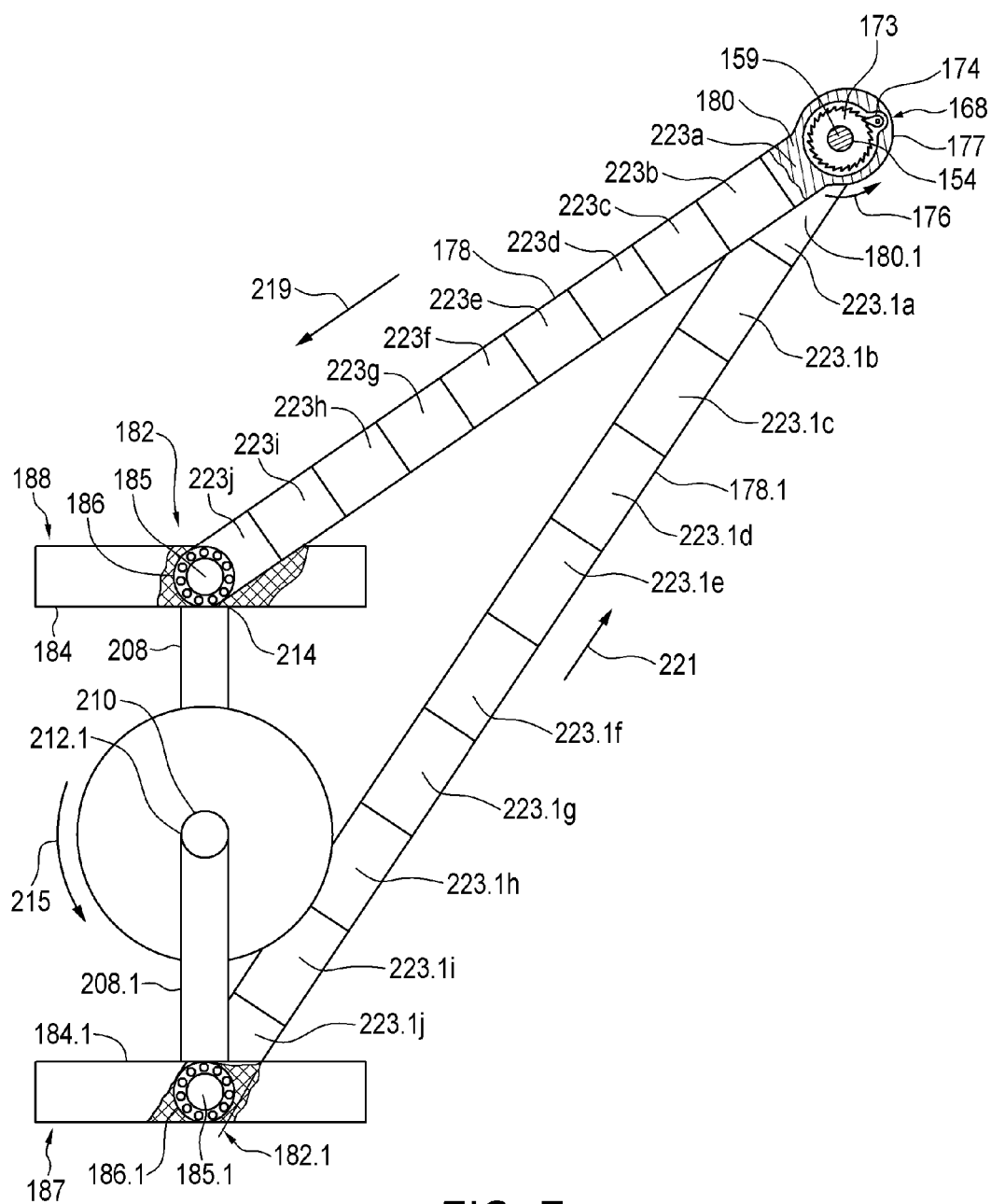
FIG. 7 is a side view of telescoping elongate members connected to pedal arms, and respective ratchet mechanisms, one being partially broken away, according to the embodiment of FIG. 5.

FIGS. 5 to 7 illustrate a bicycle 100 according to a further embodiment of the invention. Many of the various labelled parts perform in a substantially similar manner with substantially similar functions as the embodiment illustrated in FIGS. 1 to 3. Like parts have like numbers with the addition of 100 to the number. Only differences compared to the embodiment of FIGS. 1 to 3 will therefore be discussed in detail.

In this embodiment a pedal arm axle 210 is centrally located with respect to the front sprocket 133 and rotatably mounted to the front sprocket 133 at the lower end 132 of the seat tube 127 at the bottom of the frame. The front sprocket 133 is similar to that of a conventional bicycle though it is not required. The pedal arm axle 210 has an axis of rotation 212. The axis of rotation 212 of the pedal arm axle is parallel with the axis of rotation 159 of the drive axle. A first pedal arm 208 and a second pedal arm 208.1 extend radially outwards from the pedal arm axle 210 in planes parallel with the frame 111. A first pedal 184 and a second pedal 184.1 are pivotally mounted to the first pedal arm 208 and the second pedal arm 208.1, respectively. The pedals arms together with the pedals are rotatable about the axis of rotation 212. The pedal arms and the pedals in this embodiment are of the convention type known to those skilled in the art and will therefore not be discussed in greater detail.

The first elongate member 178 and the second elongate member 178.1 are telescoping tubes. The first elongate member 178 in this example has a plurality of tube portions 223a through to 223j, as best shown extended and spaced-apart from one another in FIG. 7. The second elongate member 178.1 in this example has a plurality of tube portions 223.1a through to 223.1j, as best shown retracted towards one another in FIG. 7. Those skilled in the art will appreciate that two or more tube portions 223 may be used for each elongate member.

The first elongate member 178 and the second elongate member 178.1 are pivotally connected to the first pedal 184 and the second pedal 184.1, respectively. Alternatively, the elongate members may be connected directly to the respective pedal arms.

In the mode shown in FIG. 5, the first elongate member 178 is at the lower position in an extended mode, with its telescoping tube extended. The second elongate member 178.1 is at the upper position in a retracted mode, with its telescoping tube retracted inwards. The elongate members are movable from the retracted mode to the extended mode. Telescoping tubes per se are known and therefore will not be discussed in great detail.

FIG. 6 shows the propulsion assembly in greater detail. It is similar to that shown in FIG. 3 however now the ratchet housings 69 and 69.1 of FIG. 3 are not required. The ratchet mechanisms 168 and 168.1 as well as mounting plate 160 are external to the support housing 217 which in this example extends between ratchet mechanism 168.1 and mounting plate 160.

FIG. 7 shows the telescoping elongate members, one of the ratchet mechanisms, the pedal arms, and the pedals in isolation. The first elongate member 178 is now in the upper position in the retracted mode and may extend or expand in the direction shown by arrow 219. The second elongate member 178.1 is in the lower position in the extended mode and may retract in the direction shown by arrow 221. The rest of the components within interior 172 of the ratchet housing 169, including the ratchet mechanism 168, functions as like the previous embodiment with the exception that the ratchet mechanism 168 no longer requires a resilient member or an air piston for the raising and lowering of the elongate members 178 and 178.1.

In operation, the pedals 184 and 184.1 may be rotated in the conventional manner to cause the pedals arms 208 and 208.1 to rotate with a circular motion in the direction of arrow 215. Referring to FIG. 7, this is in turn causes the pedal end 182.1 of the elongate member 178.1 to move upwards while the elongate member retracts in the direction of arrow 221. It also causes the pedal end 182 to move downwards while the elongate member 178 extends in the direction of arrow 219. This cycle repeats and in this manner the elongate members are moveable from the upper position shown by member 178 to the lower position shown by member 178.1. The pedals 184 and 184.1 provide the same circular motion as in a conventional bicycle, but they are connected to the elongate members which drive the drive sprocket 158 as illustrated in FIG. 5.

In this way the propulsion assembly of the bicycle 100, with its telescoping elongate members and pedal arms connected thereto, provides the synergy of feeling like a conventional bicycle while at the same time providing a significant increase in torque applied to drive sprocket 158 by the elongate members and hence to rear sprocket 139.

This provides an improvement over other elongate member bicycles because professional cyclists in particular are accustomed to standing on their cycles, not sitting. The structure of the present embodiment makes it possible to pedal while standing. The propulsion assembly of the bicycle 100 provides several times the torque applied to the rear sprocket of a conventional bicycle, while the circular motion of the pedals ensures the up and down motion of the elongate member levers. Those skilled in the art will appreciate that this invention can easily be modified to make possible human powered cars and human powered, ultra light aircraft.

It will further be understood by a person skilled in the art that many of the details provided above are by way of example only and can be varied or deleted without departing from the scope of the invention as set out in the following claims.

What is claimed:

1. A propulsion assembly for a bicycle having a frame with a top, a bottom opposite the top, a front with a front wheel rotatably connected thereto at the bottom, and a rear opposite the front with a rear wheel rotatably connected thereto at the bottom, the assembly comprising:
   a rearwardly extending support member extending from the frame along the top of the frame, the support member extending to a distal end of the support member, the distal end being spaced-apart from the rear wheel;
   a first drive mechanism rotatably mounted on the frame and being mechanically connected to the rear wheel for transmitting motion thereto;
   a second drive mechanism rotatably mounted near the distal end of the support member, the second drive mechanism having an axis of rotation;
   a coupling member coupling the first drive mechanism to the second drive mechanism;
   a pair of ratchet mechanisms operatively connecting to the second drive mechanism and with the axis of rotation of the second drive mechanism, the second drive mechanism being between the pair of ratchet mechanisms;
   a first elongate member and a second elongate member, each said elongate member being operatively connected to the second drive mechanism by means of a respective one of the pair of ratchet mechanisms and extending therefrom, the elongate members being telescopic;
   a pedal arm axle rotatably mounted to the frame near the bottom thereof between the front and the rear of the frame;
   a first pedal arm and a second pedal arm angularly spaced-apart from the first pedal arm, the pedal arms extending from opposite ends of the pedal arm axle; and
   a first pedal and a second pedal rotatably connected to the first pedal arm and the second pedal arm, respectively, for pedaling the bicycle, the first elongate member and the second elongate member extending towards and operatively connecting with the first pedal and the second pedal, respectively, the pedals being rotatably movable for transmitting rotational power through the elongate members and to the second drive mechanism for pedalling the bicycle.

2. The propulsion assembly as claimed in claim 1, the pedals being rotatably movable from an upper position to a lower position and wherein the first pedal arm extends in a direction opposite to the second pedal arm and the elongate members each being moveable from a retracted mode to an extended mode, whereby when the first pedal is in the upper position, the first elongate member is in the retracted mode, the second pedal is in the lower position and the second elongate member is in the extended mode, and when the first pedal is rotatably lowered to the lower position, the first elongate member is in the extended mode, the second pedal is in the upper position and the second elongate member is in the retracted mode, circular motion of the pedals arms thereby causing up and down motion in the elongate members.

3. The propulsion assembly as claimed in claim 1 wherein the elongate members vary between being two to five times longer than the pedal arms.

4. The propulsion assembly as claimed in claim 1 wherein one of the elongate members in a retracted mode is three to four times longer than one of the pedal arms, the assembly thereby enabling a user to generate at least three to four times more torque when pedalling with a given force as compared with that of a conventional bicycle when pedalling at the given force.

5. The propulsion assembly as claimed in claim 1, the bicycle further having a seat post extending outwards from the top of the frame with seat extending from therefrom, the frame further including an upper member extending along the top of the frame and connected at a junction to the seat post, the support member extending from the junction and towards the rear of the frame.

6. The propulsion assembly as claimed in claim 5, wherein the support member is flush with the upper member of the frame.

7. The propulsion assembly as claimed in claim 1, wherein the first drive mechanism includes a rear axle with the rear wheel axially mounted thereon and a rear sprocket radially extending from the rear axle near one end of the rear axle, and the second drive mechanism includes a drive axle rotatably connected to the distal end of the support member and a drive sprocket radially extending from the drive axle near one end of the drive axle.

8. The propulsion assembly as claimed in claim 5, the frame further including a pair of spaced-apart seat stays extending from the junction to a drive axle, the rear wheel being between the pair of seat stays, the pair of seat stays being in between the elongate members, the second drive mechanism being spaced-apart from the pair of seat stays.

9. The propulsion assembly as claimed in claim 1, the distal end of the support member including a support housing, the drive axle being disposed within the support housing, the support housing including a pair of ratchet housings for receiving the pair of ratchet mechanisms respectively, each of said pair of ratchet mechanisms including a hollow outer portion rotatably mounted on the drive axle and connecting to one of the elongate members, a ratchet gear disposed within the outer portion and connected to the drive axle, and a pawl pivotally connected to the outer portion and positioned for rotatable engagement with the ratchet gear in a first direction and for freely passing over with the ratchet gear in a second direction opposite the first direction.

10. The propulsion assembly as claimed in claim 9, wherein the support housing is rotatably mounted onto the drive axle via a pair of bearings and, for each of the pair of ratchet mechanism the hollow outer portion is rotatably mounted onto the drive axle via a pair of bearings.

11. The propulsion assembly as claimed in claim 1, the pedals being rotatably movable from an upper position to a lower position and wherein the elongate members are reciprocatingly mounted to the pedal arms such that when the first elongate member is in the upper position, the second elongate member is in the lower position, and when the second elongate member is in the upper position, the first elongate member is in the lower position.

12. The propulsion assembly as claimed in claim 1, the bicycle further including a seat post at the top with seat extending therefrom, and wherein the support member is positioned away from the seat post and at least towards the rear of the frame, and the second drive mechanism is spaced-apart from the seat post.

13. A propulsion assembly for a bicycle having a frame with a top, the bicycle having a seat post extending from the top of the frame and having a seat extending from the seat post, the frame including a bottom opposite the top, a front with a front wheel rotatably connected thereto at the bottom, and a rear opposite the front with a rear wheel rotatably connected thereto at the bottom, and the assembly comprising:

- a rearwardly extending support member extending from the frame, away from the seat post, to a distal end of the support member, the distal end of the support member being spaced-apart from the rear wheel, the distal end of the support member including a support housing;
- a rear axle axially connected to the rear wheel and rotatably mounted on the frame, a rear sprocket radially extending from the rear axle at one end of the rear axle, the rear sprocket being axially connected to the rear wheel for transmitting motion thereto;
- a drive axle rotatably received in part within the support housing, a rotatable drive sprocket radially extending from the drive axle at one end of the drive axle, the drive sprocket being spaced-apart from the seat post, the drive sprocket having an axis of rotation;
- an endless chain operatively connecting the rear sprocket to the drive sprocket;
- a pair of ratchet mechanisms, each of said pair of ratchet mechanisms including a hollow outer portion rotatably mounted on the drive axle via a pair of bearings, a ratchet gear disposed within the outer portion and connected to the drive axle, and a pawl pivotally connected to the outer portion and positioned for rotatable engagement with the ratchet gear in a first direction and for freely passing over with the ratchet gear in a second direction opposite the first direction;
- a first elongate member and a second elongate member, each said elongate member being connected to a respective one of the outer portions of the pair of ratchet mechanisms, the elongate members operatively extending from the drive sprocket, the elongate members being telescopic;
- a pedal arm axle rotatably mounted to the bottom of the frame between the front and the rear of the frame;
- a first pedal arm and a second pedal arm angularly spaced-apart from the first pedal arm, the pedal arms extending from opposite ends of the pedal arm axle; and
- a first pedal and a second pedal rotatably connected to the first pedal arm and the second pedal arm, respectively, for pedaling the bicycle, the first elongate member and the second elongate member extending towards and operatively connecting with the first pedal and the second pedal, respectively, the pedals being rotatably movable for transmitting one-way rotational power through the elongate members, to cause the respective pawls of the pair of ratchet mechanisms to engage respective ratchet gears in the first direction, to thereby engage the drive axle, and thereby engage and cause to rotate the drive sprocket, the endless chain, the rear sprocket and the rear wheel for pedalling the bicycle.

14. A bicycle having the propulsion assembly as claimed in claim 1.

* * * * *